(12) United States Patent
LaVigne et al.

(10) Patent No.: US 7,506,065 B2
(45) Date of Patent: Mar. 17, 2009

(54) REMOTE MIRRORING USING IP ENCAPSULATION

(75) Inventors: Bruce Edward LaVigne, Roseville, CA (US); Paul T. Congdon, Granite Bay, CA (US); Mark Gooch, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 800 days.

(21) Appl. No.: 10/723,041

(22) Filed: Nov. 26, 2003

(65) Prior Publication Data

US 2005/0114522 A1    May 26, 2005

(51) Int. Cl.
G06F 15/16 (2006.01)
G06F 15/173 (2006.01)

(52) U.S. Cl. .................. 709/245; 709/224; 709/238; 709/249

(58) Field of Classification Search .................. 709/246, 709/224, 227, 236, 238, 245, 249
See application file for complete search history.

(56) References Cited

U.S. PATENT DOCUMENTS

| | | | |
|---|---|---|---|
| 5,537,533 A * | 7/1996 | Staheli et al. ................ | 714/5 |
| 5,802,320 A | 9/1998 | Baehr et al. | |
| 6,041,042 A | 3/2000 | Bussierre | |
| 6,445,704 B1 * | 9/2002 | Howes et al. ................ | 370/392 |
| 6,618,818 B1 | 9/2003 | Wahl et al. | |
| 6,707,818 B1 * | 3/2004 | Kadambi et al. ............. | 370/391 |
| 6,839,338 B1 * | 1/2005 | Amara et al. ................ | 370/338 |
| 6,850,521 B1 * | 2/2005 | Kadambi et al. ............. | 370/389 |
| 6,957,277 B2 * | 10/2005 | Yagyu et al. ................ | 709/245 |
| 6,985,935 B1 * | 1/2006 | Zhang et al. ................ | 709/219 |
| 6,996,099 B1 * | 2/2006 | Kadambi et al. ............. | 370/389 |
| 7,042,843 B2 * | 5/2006 | Ni ............................... | 370/231 |
| 7,124,166 B2 * | 10/2006 | Brown .......................... | 709/204 |
| 2003/0185154 A1 * | 10/2003 | Mullendore et al. ......... | 370/230 |
| 2004/0003094 A1 * | 1/2004 | See ............................... | 709/227 |
| 2004/0184408 A1 * | 9/2004 | Liu et al. ..................... | 370/236 |
| 2004/0208151 A1 * | 10/2004 | Haverinen et al. ........... | 370/338 |
| 2004/0213232 A1 * | 10/2004 | Regan .......................... | 370/390 |
| 2004/0264435 A1 * | 12/2004 | Chari et al. .................. | 370/351 |

OTHER PUBLICATIONS

Patterson, Hugo et al., "Snap Mirror: File system Based Asynchronous Mirroring for Disaster Recovery", USENIX Association, Proceeding of Fast 2002 conference on file and storage Tech, pp. 1-14, Jan. 2002.*

* cited by examiner

*Primary Examiner*—Jason D Cardone
*Assistant Examiner*—Thomas Duong (57) ABSTRACT

One embodiment disclosed relates to a method for remote mirroring of network traffic. A data packet to be remotely mirrored is received by an entry device. The entry device is pre-configured with a destination Internet Protocol (IP) address to which to mirror the data packet. An IP header is generated and added to IP encapsulate the data packet. The IP header includes the aforementioned destination IP address. The IP-encapsulated packet is forwarded to an exit device associated with the destination IP address. Subsequently, the exit device may decapsulate the IP-encapsulated packet to reproduce the original data packet.

26 Claims, 6 Drawing Sheets

REMOTE MIRRORING USING IP ENCAPSULATION

BACKGROUND OF THE INVENTION

1. Field of the Invention

The present invention relates generally to networking and communications technology.

2. Description of the Background Art

Conventional mirroring solutions are highly intrusive to the network administrator, especially in large networks, requiring his/her dispatch to the physical location of the device being monitored. This is because the network analysis device is directly attached to the networking device which needs monitoring. Accordingly, there is great need for a network diagnostic system and method which does not require relocation of diagnostic devices and personnel to the physical location of the device to be monitored.

SUMMARY

One embodiment of the invention pertains to a method for remote mirroring of network traffic. A data packet to be remotely mirrored is received by an entry device. The entry device is pre-configured with a destination Internet Protocol (IP) address to which to mirror the data packet. An IP header is generated and added to IP encapsulate the data packet. The IP header includes the aforementioned destination IP address. The IP-encapsulated packet is forwarded to an exit device associated with the destination IP address. Subsequently, the exit device may decapsulate the IP-encapsulated packet to reproduce the original data packet.

Another embodiment of the invention relates to a networking device. The networking device includes at least a plurality of ports, a switching/routing engine, and a remote mirroring engine. The plurality of ports receive and transmit packets therefrom, and the switching/routing engine is coupled to the ports for transferring the packets therebetween. The remote mirroring engine is configured to detect packets from a specified mirror source, IP-encapsulate the detected packets, and forward the IP-encapsulated packets to an IP destination by way of at least one of the ports.

DETAILED DESCRIPTION

As mentioned above, in conventional mirroring solutions, the network analysis device is directly attached to the networking device which needs monitoring. This limits the usefulness of the conventional solutions. Remote mirroring overcomes this limitation by allowing for the network monitoring device to be located remotely from the monitored networking device.

Current remote mirroring technologies include Cisco System's Remote Switched Port Analyzer (RSPAN) technology. With RSPAN, packets may be mirrored to a specific RSPAN virtual local area network (VLAN). This allows the monitoring device to be on a different switch from the one being monitored. However, applicants point out that the monitoring device must still be within the OSI layer 2 domain of the traffic which is to be monitored. In addition, the packets are modified from their original format because VLAN tags have been added or replaced.

In accordance with an embodiment of the invention, the above discussed problems and disadvantages are solved. A remote mirroring solution is provided that does not require the monitoring device to be located within the layer 2 domain of the traffic which is monitored. In one implementation, the mirrored packets preserve their original format. These and other advantages are provided by embodiments of the present invention.

Note that the description below focuses on a specific embodiment of the invention where the IP-encapsulated packet is forwarded by IP routing towards its destination. The IP routing may include checking the ARP (address resolution protocol) cache, broadcasting under ARP, and other such steps. Within the scope of the invention, other technology may also be utilized to forward the packet. For example, the forwarding network may include ATM (asynchronous transfer mode) or SONET (synchronous optical network) communications technology.

Figure 1:
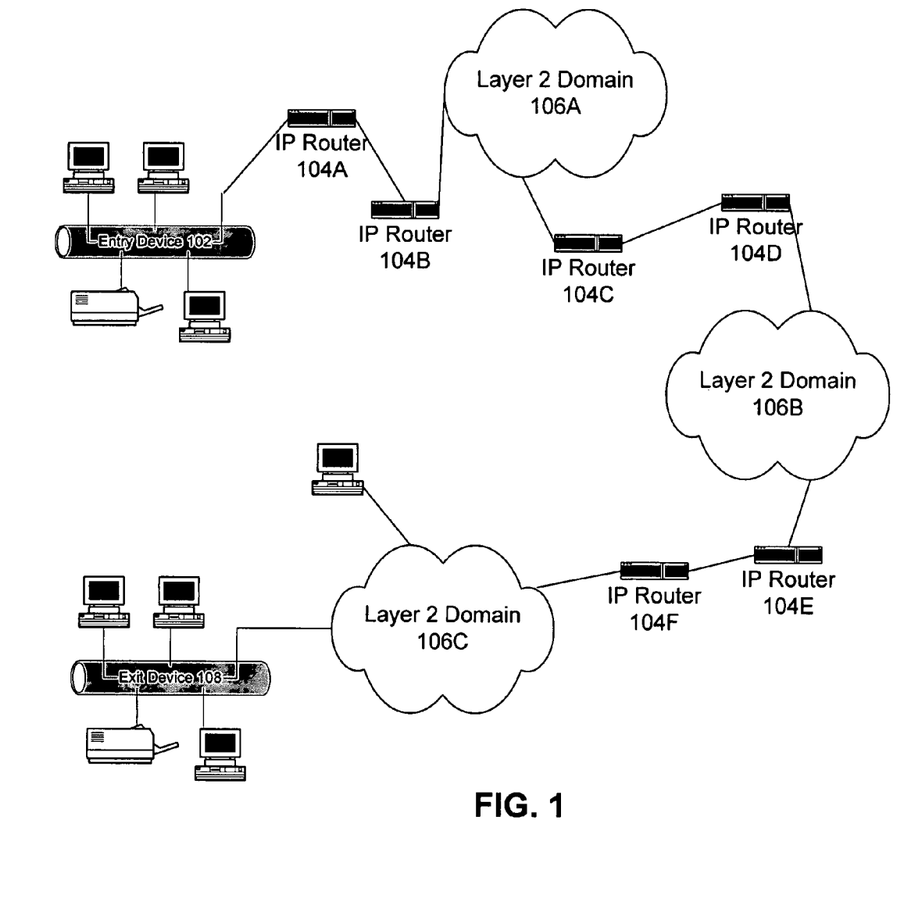
FIG. 1 is a schematic diagram depicting an internetworking system across which remote mirroring is performed in accordance with an embodiment of the invention.

FIG. 1 is a schematic diagram depicting an example of an internetworking system across which remote mirroring is performed in accordance with an embodiment of the invention. Of course, FIG. 1 shows just one example configuration for an internetworking system across which remote mirroring may be performed in accordance with an embodiment of the invention. The specific configuration in FIG. 1 is for purposes of illustration and discussion. The example internetworking system of FIG. 1 includes an entry device 102, various routers 104, layer 2 domains 106, and an exit device 108.

The entry device 102 may comprise, for example, an appropriately configured switch, router, or other network device. In one particular embodiment, the entry device may comprise an Ethernet type switch as depicted in FIG. 1. Such a switch has multiple ports to connect to various network devices. For example, as illustrated, various ports may be connected to host devices, and a port may connect to an IP router 104A. When packets are destined for IP addresses that are not present in the local layer 2 domain of the entry device, then those packets may be forwarded to their destination via the IP router. Such packets may be forwarded between various routers 104 and across intermediate layer 2 domains 106 in order to reach the exit device 108.

The exit device 108 may comprise, for example, an appropriately configured switch, router, or other network device. A sniffer or analyzer may be coupled to a port of the exit switch or router to examine or analyze the mirrored packets. Alternatively, it is possible that the exit device is itself a computer that functions as a sniffer or analyzer.

Entry and exit devices (102 and 108) which utilize the IP encapsulation/de-encapsulation technique of the present invention may be embodied in a switching product, such as, for example, an HP ProCurve® switch product available from the Hewlett-Packard Company, with corporate offices in Palo Alto, Calif. Of course, the entry and exit devices may also be implemented with switch products from other companies. The entry and exit devices may also be embodied in other networking device products, such as routers and hubs.

An embodiment of the present invention is advantageously compatible with pre-existing intermediate networking gear in between the entry and exit devices. The intermediate networking gear need not be from any particular manufacturer. In other words, end-to-end control between the entry and exit devices is not required by the present invention.

As described further below, remote mirroring using IP encapsulation in accordance with the present invention is a layer 3 technique and so may transverse across various layer 2 domains. For example, the IP-encapsulated packets may be remotely mirrored across the pre-existing public Internet.

Figure 2:
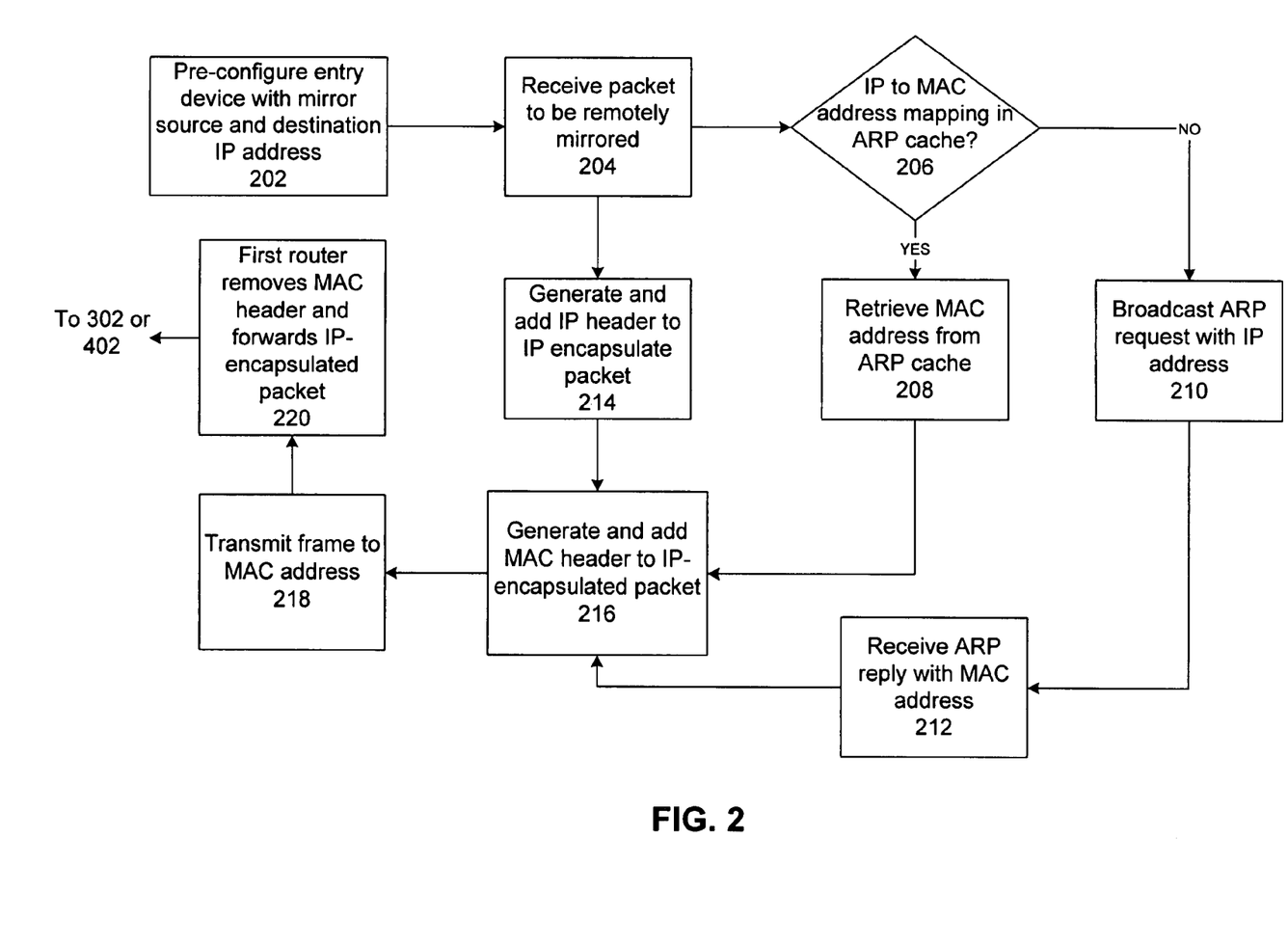
FIG. 2 is a flow chart depicting a method of IP encapsulation for remote mirroring in accordance with an embodiment of the invention.

FIG. 2 is a flow chart depicting a method of IP encapsulation for remote mirroring in accordance with an embodiment of the invention. Initially, the entry device 102 is pre-configured 202 with a mirror source and a destination IP address. The mirror source is the source of the data packets to be mirrored, and the destination IP address is the IP address to which the mirror packets are to be sent. While the data packets to be mirrored are referred to as "packets," it is understood that the packets to be mirrored may comprise layer 2 data frames, or layer 3 packets, or other types of data packets.

In accordance with embodiments of the invention, the entry device may be configured to mirror packets from various types of sources. The following types of sources are a few examples. Other source types may also be possible. The mirroring may be configured for either received packets, transmitted packets, or both.

A first type of mirror source is traffic received and/or transmitted via a specified port. Mirroring from such a source may be called port-based mirroring. In one implementation, a variable number of source ports may be specified per mirror session.

A second type of mirror source is traffic received and/or transmitted to one or more specified VLAN(s). Mirroring from such a source may be called VLAN-based mirroring. The traffic relating to the specified VLAN(s) may be detected by determining whether a packet has a VLAN tag with one or more specified VLAN identifier(s).

A third type of source is traffic received and/or transmitted that matches an entry in a media access control (MAC) look-up table (LUT). Mirroring from such a source may be called MAC-based mirroring. In one implementation, a variable number of LUT entries may be programmed per mirror session.

A fourth type of source is traffic received and/or transmitted that matches an entry in an IP look-up table. Mirroring from such a source may be called IP-based mirroring. In one implementation, a variable number of look-up table entries may be programmed per mirror session.

A fifth type of source is traffic transmitted that matches an IP subnet address, an entry in the best matching prefix (BMP) table. Mirroring from such a source may be called subnet-based mirroring. In one implementation, a variable number of BMP table entries may be programmed per mirror session.

A sixth type of source is traffic matching an access control list (ACL) entry. Mirroring from such a source may be called ACL-based mirroring. In one implementation, a variable number of ACL entries may be programmed per mirror session. These lookups may be performed for both bridged and routed IP packets.

From whichever mirror source, a packet to be remotely mirrored is received 204 by the entry device 102. In response, the entry device 102 generates and adds 214 an IP header to the packet to IP-encapsulate the packet. The IP header will include the pre-configured destination IP address to which the mirrored packets are to be sent.

In accordance with an embodiment of the invention, the "do not fragment" bit (flags bit 0×02) in the IP header may be set so that the IP-encapsulated packet is not broken down and transmitted in separate fragments. This ensures that the mirrored packet will be forwarded in a single IP-encapsulated packet. In accordance with another embodiment, the "do not fragment" bit may be cleared to allow for fragmentation of the mirrored packet.

In one embodiment, an incrementing identifier is included in the generated IP header. This identifier may be used to determine whether mirrored packets arrive at the exit point in order and without drops. In addition, the identifier may be used to re-order the mirrored packets so that a sniffer or analyzer connected to the exit device can see the packets in the order they were received at the entry point.

In this example, the entry device 102 is on a layer 2 network and so must determine the destination MAC address for the IP-encapsulated packet. In accordance with one embodiment, this may be accomplished as follows. The local address resolution protocol (ARP) cache is checked 206 to see if there is stored therein a mapping between the destination IP address and a MAC address. If there is such an entry in the ARP cache, then the MAC address corresponding to the IP address is retrieved 208 therefrom. If not, then an ARP request with the IP address is broadcast 210, and an ARP reply with the appropriate MAC address is received 212.

Once the MAC address is known, a MAC header with the MAC address in the destination address field is generated and added 216 to the IP-encapsulated packet to form a MAC data frame. The data frame is then transmitted 218 over the layer 2 network to device with that MAC address.

In the example internetworking system of FIG. 1, the MAC address may correspond to an IP router 104A that is coupled to a port of the entry device. This first IP router removes the MAC header and uses a routing algorithm to forward 220 the IP-encapsulated packet onwards towards its IP destination. In the example of FIG. 1, the IP-encapsulated packet is forwarded to a next router 104B.

Figure 3:
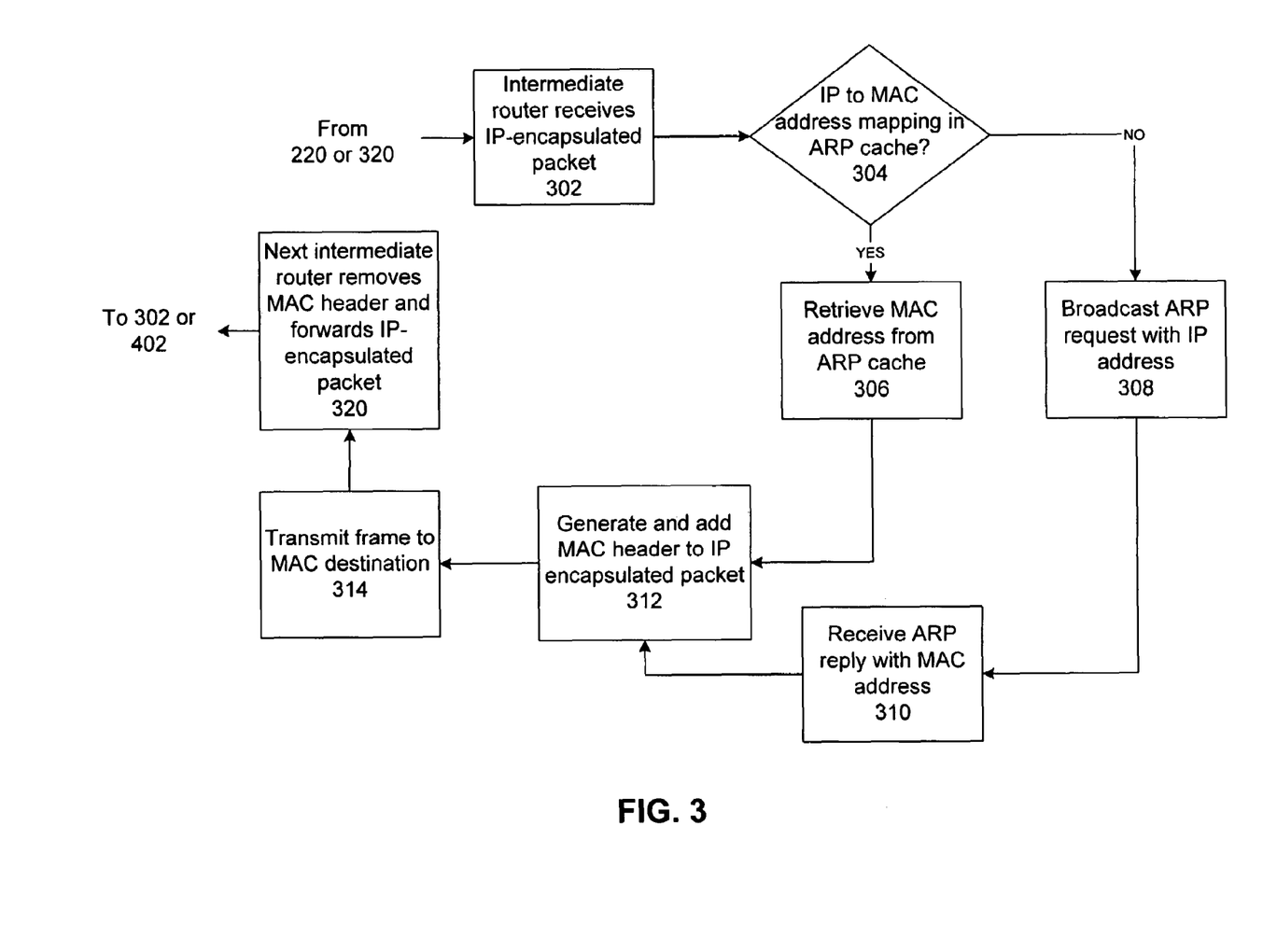
FIG. 3 is a flow chart depicting a method of forwarding an IP-encapsulated mirrored packet by intermediate routers in accordance with an embodiment of the invention.

FIG. 3 is a flow chart depicting a method of forwarding an IP-encapsulated mirrored packet by intermediate routers in accordance with an embodiment of the invention. The IP-encapsulated packet is received 302 from a prior router by the intermediate IP router 104. For example, per the internetwork of FIG. 1, the IP router 104B receives the IP-encapsulated packet from the first IP router 104A (and, later on, the IP router 104D receives the IP-encapsulated packet from the prior IP router 104C).

In this example, the intermediate IP router 104 is on a layer 2 network and so must determine the destination MAC address for the IP-encapsulated packet. In accordance with one embodiment, this may be accomplished as follows. The local ARP cache is checked 304 to see if there is stored therein a mapping between the destination IP address and a MAC address. If there is such an entry in the ARP cache, then the MAC address corresponding to the IP address is retrieved 306 therefrom. If not, then an ARP request with the IP address is broadcast 308, and an ARP reply with the appropriate MAC address is received 310.

Once the MAC address is known, a MAC header with the MAC address in the destination address field is generated and added 312 to the IP-encapsulated packet to form a MAC data frame. The data frame is then transmitted 314 over the intermediate layer 2 network 106A (or 106B) to device with that MAC address.

In the example internetworking system of FIG. 1, the MAC address may correspond to an IP router 104C (or 104E) that is connected to the intermediate layer 2 domain 106A (or 106B). This IP router removes the MAC header and uses a routing algorithm to forward 320 the IP-encapsulated packet further towards its IP destination. In the example of FIG. 1, the IP-encapsulated packet is forwarded to a next router 104D (or 104F).

Figure 4:
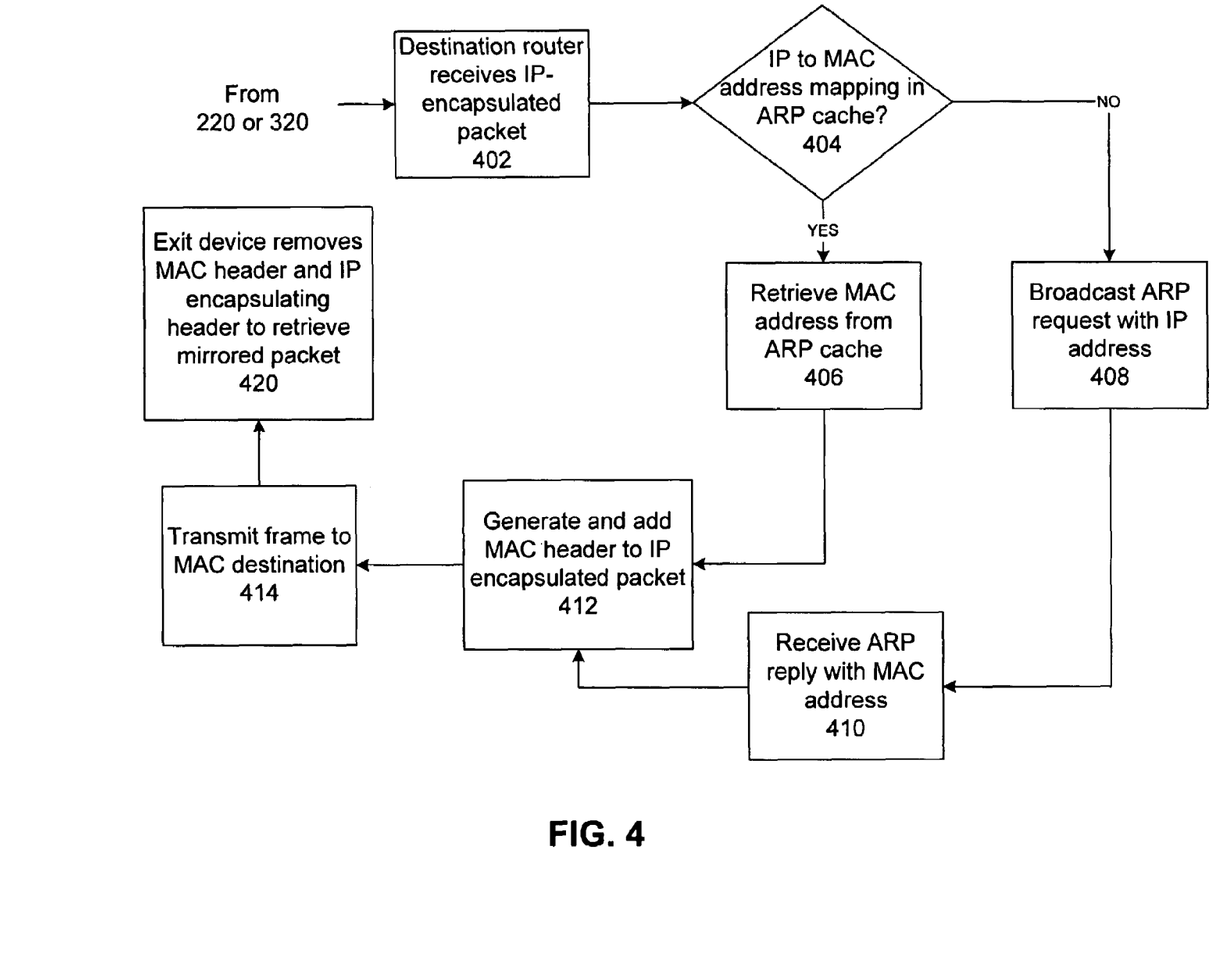
FIG. 4 is a flow chart depicting a method of IP de-encapsulation for remote mirroring in accordance with an embodiment of the invention.

FIG. 4 is a flow chart depicting a method of IP de-encapsulation for remote mirroring in accordance with an embodiment of the invention. The IP-encapsulated packet is received 402 from a prior router by the destination IP router 104. For example, per the internetwork of FIG. 1, the destination IP router 104F receives the IP-encapsulated packet from the prior IP router 104E.

In this example, the destination IP router 104F is on a layer 2 network and so must determine the destination MAC address for the IP-encapsulated packet. In accordance with one embodiment, this may be accomplished as follows. The local ARP cache is checked 404 to see if there is stored therein a mapping between the destination IP address and a MAC address. If there is such an entry in the ARP cache, then the MAC address corresponding to the IP address is retrieved 406 therefrom. If not, then an ARP request with the IP address is broadcast 408, and an ARP reply with the appropriate MAC address is received 410.

Once the MAC address is known, a MAC header with the MAC address in the destination address field is generated and added 412 to the IP-encapsulated packet to form a MAC data frame. The frame is then transmitted 414 over the final layer 2 network 106C to device with that MAC address.

In the example internetworking system of FIG. 1, the MAC address may correspond to the exit device 108. The exit device 108 removes 420 the MAC header and the IP encapsulating header to retrieve the mirrored packet. In accordance with one embodiment, the mirrored packet is an exact duplicate copy of the original packet that was mirrored by the entry device.

Figure 5:
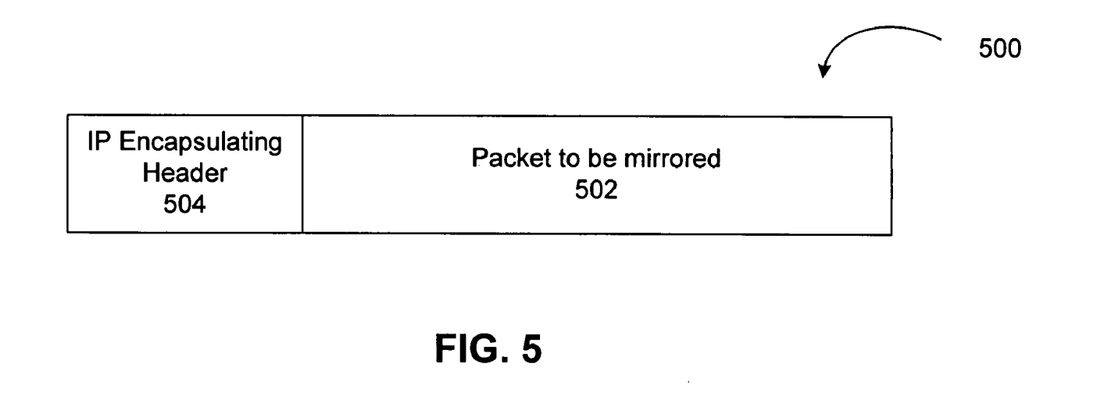
FIG. 5 is a schematic diagram depicting an IP-encapsulated packet in accordance with an embodiment of the invention.

FIG. 5 is a schematic diagram depicting an IP-encapsulated data packet in accordance with an embodiment of the invention. As depicted, the IP-encapsulated packet 500 includes the packet to be mirrored 502. Pre-pended at the beginning of the packet to be mirrored 502 is the IP-encapsulating header 504.

Figure 6:
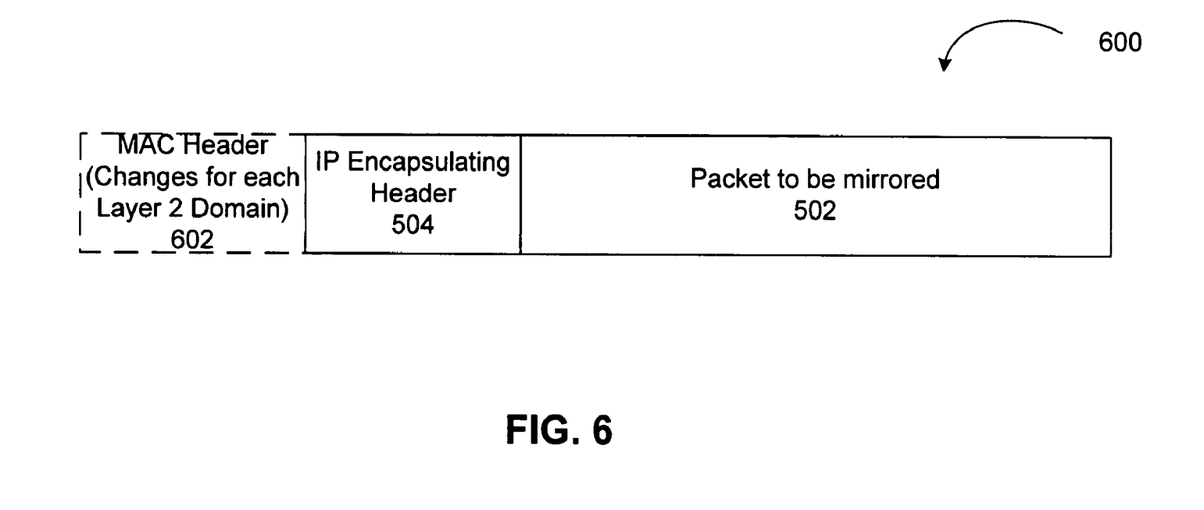
FIG. 6 is a schematic diagram depicting a MAC data frame in accordance with an embodiment of the invention.

FIG. 6 is a schematic diagram depicting MAC data frame in accordance with an embodiment of the invention. Each separate layer 2 domain pre-pends a different MAC header 602 to the IP encapsulated packet 500. This forms a MAC data frame 600 that can be forwarded across a layer 2 domain.

Figure 7:
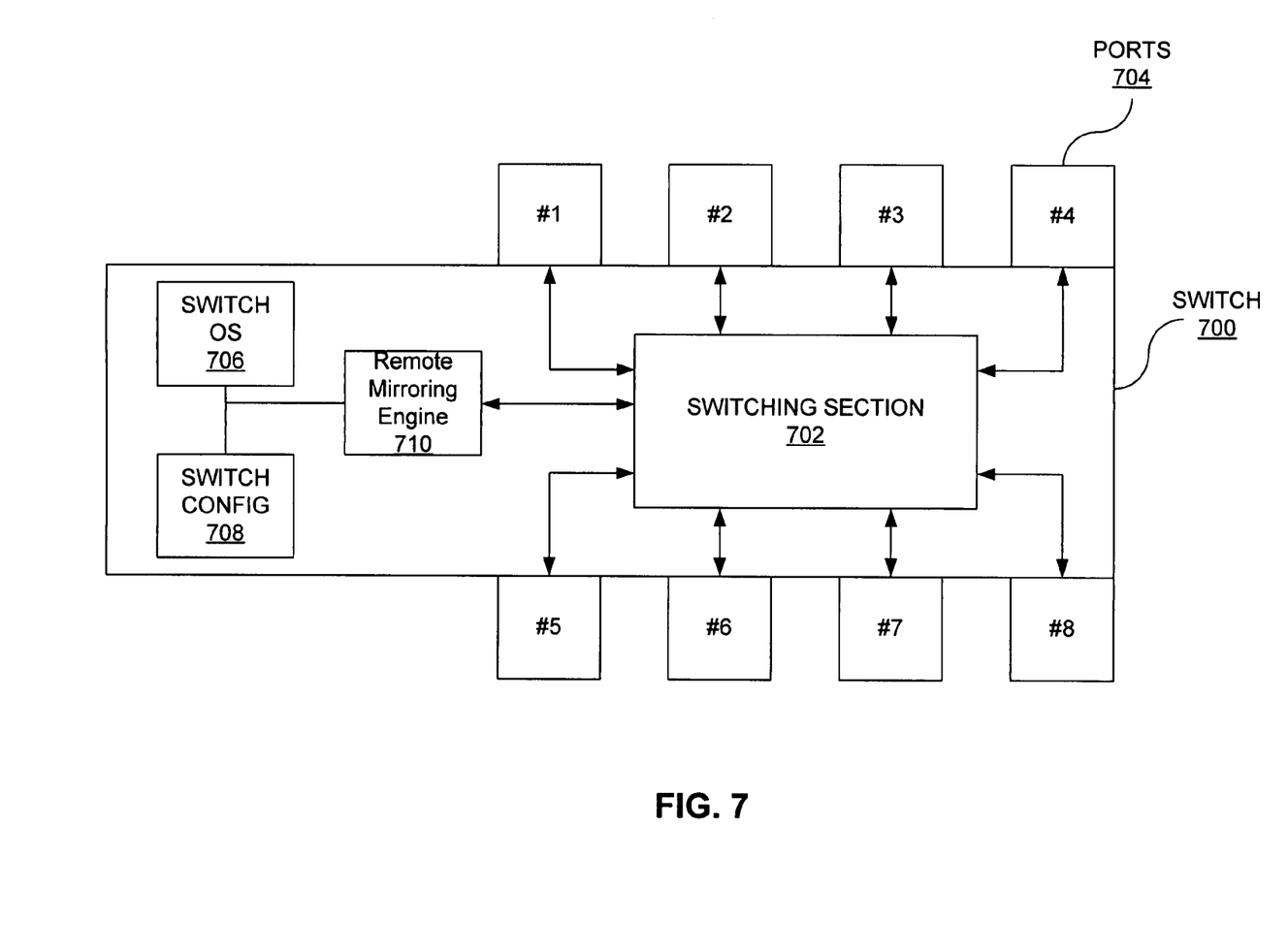
FIG. 7 is a schematic diagram illustrating a networking switch in accordance with an embodiment of the invention.

FIG. 7 is a schematic diagram illustrating a networking switch in accordance with an embodiment of the invention. The switch 700 includes a switching section 702, a plurality of switch ports 704, a switch operating system (OS) 706, a switch configuration 708, and a remote mirroring engine 710. Such a switch 700 may be utilized as the entry device for the IP-encapsulated remote mirroring in accordance with an embodiment of the invention.

The switching section 702 is coupled to each of the ports 704. The switching section may include, for example, a switching core such as a crossbar switch or other circuitry, and makes connections between the ports 704 so that data frames can be transferred from one port to another port.

Eight switch ports 704 are shown in this example. The ports 704 are shown as numbered, for example, as #1, #2, #3, #4, #5, #6, #7, and #8. Of course, other implementations may include any number of ports.

The switch OS 706 includes software routines used to control the operation of the switch 700. The switch configuration file 708 includes configuration information utilized by the switch OS 706. For example, the switch configuration file 708 may include the configuration data for the mirroring source and the IP destination for the remote mirroring. The remote mirroring engine 710 includes circuitry to implement the IP-encapsulated remote mirroring in accordance with an embodiment of the invention.

In another embodiment of the invention, the entry device for the IP-encapsulated remote mirroring may comprise a router, rather than a switch. The router would also include a remote mirroring engine and a plurality of ports. Instead of a switching section (switching engine), the router would be configured with a routing engine. Also, instead of a switch OS and a switch configuration, the router would be configured with a router OS and router configuration. Other differences would between a switch and a router would be apparent to one of skill in the art.

In accordance with an embodiment of the invention, a best effort mode may be enabled or disabled at the entry device 102 for the remote mirroring. Typically, using a best effort mode for the mirrored traffic will prevent head-of-line blocking issues. This is especially true if the mirror link is overloaded with traffic. However, in other circumstances, for example, if the mirrored traffic is known to be light but bursty, it may be desirable to disable the best effort mode (and to enable a lossless mode). In that case, the risk of head-of-line blocking is taken in order to be assured that all traffic is correctly mirrored.

In certain circumstances, the remote mirroring traffic may transverse across a packet-size limited network. The encapsulated packet may be larger than the maximum packet size allowed by such a network. In accordance with an embodiment of the invention, that problem may be circumvented by configuring the entry device 102 to truncate the payload of the packet prior to transmission such that the encapsulated packet is within the allowed size limitations.

In other circumstances, the remote mirroring traffic may transverse across a bandwidth-constrained network. In accordance with an embodiment of the invention, the bandwidth-constraint problem may be alleviated by configuring the entry device 102 to compress the packet (or a portion thereof) prior to transmission so as to reduce the size of the encapsulated packet. In addition, the exit device 108 may be configured to de-compress the packet (or portion thereof) to re-constitute the mirrored packet.

In other circumstances, the remote mirroring traffic may transverse across an unsecured network or networks. In accordance with an embodiment of the invention, this security problem may be addressed by configuring the entry device 102 to encrypt the packet (or a portion thereof) prior to transmission so as to provide a level of security of the data therein as the encapsulated packet crosses the unsecured network(s). In addition, the exit device 108 may be configured to decrypt the packet (or portion thereof) to re-constitute the data therein.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for remote mirroring of network traffic between a first network layer 2 domain and a second network layer 2 domain, the method comprising:
    receiving by an entry device a data packet to be remotely mirrored from the first network layer 2 domain, wherein the entry device is pre-configured with a destination Internet Protocol (IP) address to which to mirror the data packet, and the destination IP address is associated with a remote exit device in the second network layer 2 domain;
    generating and adding an IP header to IP encapsulate the data packet, wherein the IP header includes the destination IP address;
    forwarding the IP-encapsulated packet to an exit device associated with the destination IP address; and
    configuring the entry device in a best effort mirroring mode to reduce head-of-line blocking.

2. The method of claim 1, further comprising:
    determining a media access control (MAC) address associated with the destination IP address;
    generating and adding a MAC header to the IP-encapsulated packet to form a MAC data frame, wherein the MAC header includes the MAC address in a destination field; and
    transmitting the MAC data frame to communicate the IP-encapsulated packet across the second network layer 2 domain to the remote exit device.

3. The method of claim 2, wherein determining the MAC address comprises:
    determining if a mapping of the destination IP address to the MAC address is stored in an address resolution protocol (ARP) cache;
    if so, then retrieving the MAC address from the ARP cache; and
    if not, then broadcasting an ARP request with the destination IP address and receiving an ARP reply with the MAC address.

4. The method of claim 2, wherein the IP-encapsulated packet is communicated across at least one intermediate layer 2 domain.

5. The method of claim 1, further comprising:
    receiving the IP-encapsulated packet by the exit device; and
    removing the IP header to de-encapsulate the packet.

6. The method of claim 1, wherein the remote mirroring preserves an original format of the data packet.

7. The method of claim 1, further comprising:
    pre-configuring the entry device to mirror data packets from at least one specified port of the entry device.

8. The method of claim 1, further comprising:
    pre-configuring the entry device to mirror data packets which include a VLAN tag with at least one specified VLAN identifier.

9. The method of claim 1, further comprising:
    pre-configuring the entry device to mirror data packets which include MAC addresses that matches at least one entry in a MAC look-up table.

10. The method of claim 1, further comprising:
    pre-configuring the entry device to mirror data packets which include IP addresses that matches at least one entry in an IP hash table.

11. The method of claim 1, further comprising:
    pre-configuring the entry device to mirror data packets which include an IP destination address that matches at least one specified subnet entry in a best matching prefix (BMP) table.

12. The method of claim 1, further comprising:
    pre-configuring the entry device to mirror data packets matching at least one access control list (ACL) entry.

13. The method of claim 1, further comprising:
    configuring the entry device in a lossless mirroring mode to assure completeness of mirrored traffic.

14. A method for remote mirroring of network traffic between a first network layer 2 domain and a second network layer 2 domain, the method comprising:
    receiving by an entry device a data packet to be remotely mirrored from the first network layer 2 domain, wherein the entry device is pre-configured with a destination Internet Protocol (IP) address to which to mirror the data packet, and the destination IP address is associated with a remote exit device in the second network layer 2 domain;
    generating and adding an IP header to IP encapsulate the data packet, wherein the IP header includes the destination IP address;
    forwarding the IP-encapsulated packet to an exit device associated with the destination IP address; and
    truncating the data packet to reduce a size of the IP-encapsulated packet prior to forwarding thereof.

15. The method of claim 1, further comprising:
    compressing at least a portion of the data packet to reduce a size of the IP-encapsulated packet prior to forwarding thereof.

16. The method of claim 1, further comprising:
    encrypting at least a portion of the data packet to provide a level of security prior to forwarding the IP-encapsulated packet.

17. A networking device configured with a mirroring capability to a remote exit device in a different network layer 2 domain, the networking device comprising:
    a plurality of ports for receiving and transmitting packets therefrom;
    a switching/routing engine coupled to the ports for transferring the packets therebetween;
    a remote mirroring engine configured to detect packets from a specified mirror source, IP-encapsulate the detected packets with an internet protocol (IP) header, and forward the IP-encapsulated packets towards an IP destination by way of at least one of the ports,
    wherein the device includes a best effort mirroring mode to reduce head-of-line blocking.

18. The networking device of claim 17, wherein the specified mirror source comprises at least one of said ports.

19. The networking device of claim 17, wherein the specified mirror source comprises at least one specified VLAN.

20. The networking device of claim 17, wherein the specified mirror source comprises those packets matching entries in a look-up table.

21. The networking device of claim 17, wherein the specified mirror source comprises at least one specified subnet.

22. The networking device of claim 17, wherein the specified mirror source comprises those packets matching entries in an access control list.

23. The networking device of claim 17, wherein the device includes a lossless mirroring mode to assure completeness of mirrored traffic.

24. A networking device configured with a mirroring capability to a remote exit device in a different network layer 2 domain, the networking device comprising:
- a plurality of ports for receiving and transmitting packets therefrom;
- a switching/routing engine coupled to the ports for transferring the packets therebetween; and
- a remote mirroring engine configured to detect packets from a specified mirror source, IP-encapsulate the detected packets with an internet protocol (IP) header, and forward the IP-encapsulated packets towards a preconfigured IP destination by way of at least one of the ports.

25. The networking device of claim 17, wherein the device compresses at least a portion of the data packet to result in a size reduction of the IP-encapsulated packet prior to forwarding thereof.

26. The networking device of claim 17, wherein the device encrypts at least a portion of the data packet to provide a level of security prior to forwarding the IP-encapsulated packet.

* * * * *

UNITED STATES PATENT AND TRADEMARK OFFICE
CERTIFICATE OF CORRECTION

| | | |
|---|---|---|
| PATENT NO. | : 7,506,065 B2 | Page 1 of 1 |
| APPLICATION NO. | : 10/723041 | |
| DATED | : March 17, 2009 | |
| INVENTOR(S) | : Bruce Edward LaVigne et al. | |

It is certified that error appears in the above-identified patent and that said Letters Patent is hereby corrected as shown below:

In column 8, line 48, in Claim 17, after "therebetween;" insert -- and --.

Signed and Sealed this

Twenty-third Day of February, 2010

David J. Kappos
*Director of the United States Patent and Trademark Office*